June 17, 1952        A. LERBS        2,600,509

TRAVELING WAVE TUBE

Filed July 15, 1948

INVENTOR
ALFRED LERBS
By Haseltine, Lake & Co.
AGENTS

Patented June 17, 1952

2,600,509

UNITED STATES PATENT OFFICE 2,600,509

TRAVELING WAVE TUBE

Alfred Lerbs, Paris, France, assignor to Compagnie Generale De T. S. F., a corporation of France Application July 15, 1948, Serial No. 38,917
In France August 1, 1947

10 Claims. (Cl. 179—171)

The U. S. patent application, Serial Number 23,063, filed May 24, 1948, for "Tubes of the magnetron type for ultra-short waves," and now U. S. Patent No. 2,566,087, granted August 28, 1951, has already described a tube wherein use is made of an electro-magnetic wave travelling at a given velocity in the anode system and wherein the use of a radial electrical field and of a transverse electrical field has for effect to impress upon the electrons a rotary movement around the cathode, during which movement the electrons enter into an exchange of energy with the electro-magnetic wave. This tube was constituted in such a manner that the electro-magnetic wave had the same velocity as the electrons with a view to increasing the efficiency and power. The anode circuit producing this wave could take the form which allows the creation of this wave and the determination of its progression, notably in the form of an artificial line constituted either by suitable proportioning of the cavity resonators of a split or slotted anode or by the use of a solenoid in the form of a circle or in any suitable manner. Means were provided in the said part which enabled the use of this tube as a power amplifier, said means being destined to avoid the starting of oscillations.

The present invention relates generally to the same type of tube and it has for its object to increase the power very substantially by decreasing the heating of the anode due to electric bombardment, said heating being particularly apparent when the anodes are constituted by a helical winding and where it is added to the heating provoked by the skin effect.

According to the invention, the fraction of the anode participating in the exchange of energy is separated into two mutually parallel portions destined the one to the creation and propagation of the electro-magnetic wave and the other to collecting the electrons progressively as they exchange the energy, and this second portion is given a sufficient mass to enable radiation of heat.

The collecting anode is constituted either as a single piece in which case it is arranged preferably between two travelling wave anodes or, according to a modification, there are two collecting anodes arranged on either side of a single travelling wave anode. For collecting the electrons, the electrical field of the tube is given a shape and a disposition such that it presents a component which is preferably parallel to the magnetic field. It is constituted by giving a suitable shape to the collecting anode and to the cathode surface and the tensions applied by these electrodes are suitably selected. Instead of acting on the electrical field of the tube, the same result can be obtained by acting suitably upon the magnetic field.

In the accompanying drawings which are given by way of illustrating examples and which will enable a better understanding of the object of the invention:

Figure 1:
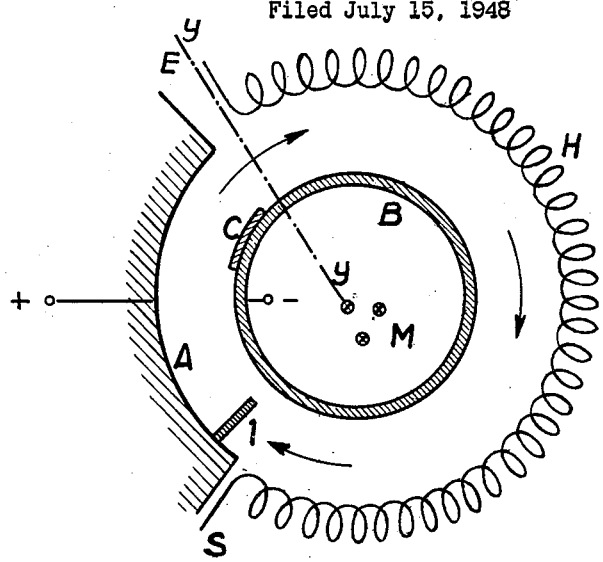
Figure 1 represents a tube in accordance with the aforementioned patent.

In Figure 1, E and S represent respectively the input and output terminals of travelling wave anode H which receives the signal through E and which supplies its output through S. The cathode is seen as tube B which is covered over a part of its surface C by an emissive layer. The latter may extend over the whole surface of the cathode but I have found that it is sufficient if only a portion in the neighborhood of input terminal E is made emissive. Magnetic field M is assumed to be perpendicular to the plane of the drawing. A represents a fraction of the anode which is impressed with a positive tension relatively to the cathode offering a free passage for the propagation of the travelling wave and enabling a reduction of the likelihood that spontaneous oscillations will be initiated. For this same purpose the electrical flux which flows according to the arrows is arrested by electrode I connected to a source of positive potential.

Figure 2:
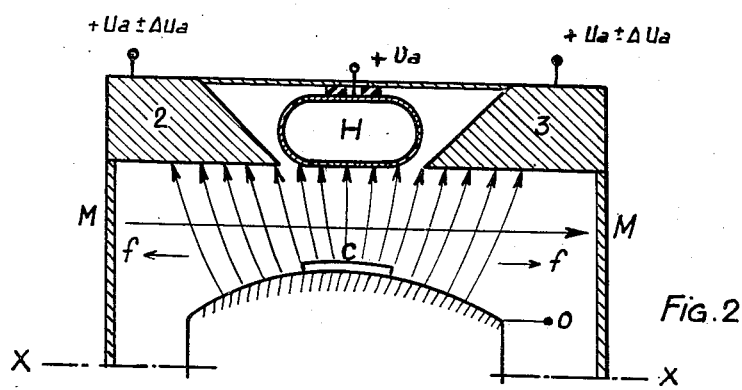
Figure 2 shows a modification of the tube in accordance with the invention in partial section taken on a line analogous to y—y of Figure 1.

I have found that a notable increase of power offered by such tubes gives rise to very intense heating of helix H, said heating being due particularly to the electron bombardment added to the loss due to skin effect. In order to reduce this heating, the anode is divided into two portions, one of which collects the greater part of the electrons and is hereinafter called the collecting anode while the other is intended for propagating the travelling wave. In Figure 2, anode H represents the helically wound portion of the anode which is destined to create a travelling electro-magnetic wave. 2 and 3 represent the collecting anodes arranged on either side of anode H while C represents the emissive fraction of the cathode. The magnetic field is indicated by the arrow MM. The electrical field is represented by the bunch of arrows going from the cathode toward the anode elements which receive positive potentials relatively to the cathode. Collecting electrodes 2 and 3 and the cathode are given a suitable profile and the former are supplied with a suitable positive potential in such manner that the electrical field between these anodes and the cathode includes a slight component $f$—$f$ in the same direction as the magnetic field. This adjustment of the potential between the collecting electrodes and the anode is shown in the drawing by symbol $Ua \pm \Delta Ua$, the anode itself being raised to the potential $Ua$ and the cathode being maintained at zero potential. Furthermore, the latter does not have a cylindrical but rather a curved contour as shown in the drawing.

As a combined result of the normal field going from the cathode toward the anodes in a direction at right angles to the magnetic field and of the latter field, the electrons are displaced in accordance with a classical circular trajectory. As a result of component $f$ of the electrical field on the other hand, which does not interfere with the magnetic field since it is parallel thereto, the electrons acquire linear displacement in the direction of arrow $f$, this displacement being superimposed on the normal rotary movement and in this manner they are able to reach the collecting electrodes.

Figure 3:
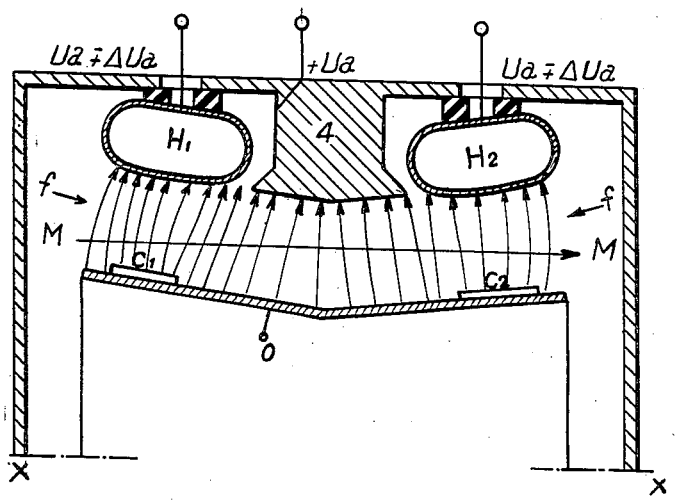
Figure 3 shows a further modification of this tube seen also on y—y.

In order to reduce the losses due to very high frequency (which losses result from the skin effect), it is advantageous to divide into two portions the travelling wave anode as shown in the modification according to Figure 3 which to all intents and purposes, enables the power to be doubled. In Figure 3, $H_1$, $H_2$ represent these two anodes arranged on either side of a single collecting anode 4. In this embodiment, the cathode is provided with two emissive portions $C_1$ and $C_2$, the contour of the electrodes as well as the tension applied thereto are selected in such manner as to create component $f$—$f$ perpendicular to the normal direction of the electrical field indicated by the group of arrows going from the cathode toward the anode. In particular, the contour of the cathode will have substantially the shape of two truncated cones joined by their smaller base and which are seen in partial section in the drawing. This transverse component $f$—$f$ directs the electrons toward collecting electrode 4.

The anode elements can all receive different anodic potentials relatively to the cathode as shown in the drawing and it will be seen that the cathode is raised to a potential zero, collecting anode 4 to a potential $Ua$ and the anodes to a potential $Ua \pm \Delta Ua$. The required magnitude of the transverse electrical vector $(f)$ is determined by the length of the line traversed by the travelling wave, by the dimensions of the electrodes by their spacing and by the tensions applied thereto. In a given tube, in order to adjust the magnitude of this vector, provision is preferably made for a difference in the adjustable tensions between the travelling wave electrode and the collecting electrodes.

The existence in the electrical field of a component parallel to the direction of the magnetic field does not introduce in practice any disturbance in the normal performance of the tube which is characterized by the exchange of energy between the electrons and the travelling wave electrode. This component is relatively small and it is possible for the efficiency of the tube plotted as a function of the anode potential to have a curve with a flattened maximum. On the other hand, the presence of a transverse electrical field adjustable by varying the tensions offers one advantage by enabling an improvement in the amplification mechanisms or a modification in the amplification characteristic by adjusting the transit time of the electrons and thus avoiding the introduction of an incorrect phase due to an excessive time spent in the anode space.

A change in the movement of the electrons in the required direction could be obtained by deforming the magnetic field without modifying the electrical field or by deforming both fields. It will be readily appreciated that the effects of such deformation are analogous to what has been already described and it is therefore not necessary to enter into further details. In practice it is preferable to deform the electrical field since it is always less easy to effect than the deforming of the magnetic field.

Finally an increase in the power of the tube can be achieved by dissipating a portion of the heat accumulated in the helix by winding it on a hollow tube inside which a cooling liquid is circulated.

What I claim is:

1. Tube for ultra-high frequencies of the travelling wave type, comprising an anode in the form of a wave propagation delay line parallel to a cathode, means for injecting an electron beam in the space between said anode and cathode, means for producing an electrical field normal to said electron beam between said anode and cathode, means for producing a magnetic field at right angles to said electrical field and to said electron beam, and at least one additional electrode extending parallel to said anode but displaced with respect to this anode in the direction of the said magnetic field, and terminal connections to raise said additional electrode to a potential which is positive relatively to said cathode.

2. Tube of the travelling wave type for ultra high frequencies, comprising an anode having the shape of a helix folded along a circular line and surrounding a cathode, means for producing an electrical field between said electrodes, means for producing a magnetic field substantially at right angles to the plane of said circular line and two additional electrodes arranged on either side of said anode symmetrically with respect to said cathode.

3. Tube of the travelling wave type for ultra high frequencies, comprising two anodes having each the shape of a helix folded along a circular line and surrounding a cathode, means for producing an electrical field between each of said anodes and said cathode, means for producing a magnetic field substantially at right angles to the plane of said circular line and an additional electrode arranged between said two anodes and facing said cathode.

4. Tube of the travelling wave type for ultra high frequencies, comprising a cathode having a surface of revolution, an emissive layer on said surface, a transmission anode having the shape of a helix folded in a circle around the axis of said cathode and facing said emissive layer, two substantially massive additional anodes arranged on either side of said helical anode, parallel thereto and substantially at the same level relatively to said cathode, means for producing electrical fields between said anodes and said cathode and means for producing a magnetic field parallel to the axis of said cathode.

5. Tube of the travelling wave type for ultra high frequencies, comprising a cathode having a surface of revolution, two emissive layers on said surface and spaced axially with relation to each other, two transmission anodes having the shape of helices folded in circles around the axis of said cathode and facing said emissive layers, a relatively massive additional anode arranged between said anodes parallel thereto and spaced from said cathode, means for producing electrical fields between said anodes and said cathode and means for producing a magnetic field parallel to the axis of said cathode.

6. Travelling wave tube having two parallel electrodes of curvilinear shape, one of said electrodes comprising a plurality of conductors extending parallel to each other and opposite the other electrode, at least one of said conductors comprising means to retard the electromagnetic wave propagated in that conductor, and at least one other conductor being of massive nature, means to inject a beam of electrons into the space between said two electrodes, means to produce a magnetic field through said space perpendicularly to said beam, and means comprising said curvilinear shaped electrodes to produce between said electrodes an electric field having an essential component directed perpendicularly to the beam and to the magnetic field and a relatively reduced component directed parallel to the magnetic field.

7. Tube according to claim 6, including means to apply to the massive conductors of the electrode, which is composed of several conductors, a potential different from the potential of the conductor effecting the delay of the wave and positive with respect thereto.

8. Tube according to claim 6, wherein the electrode other than the one divided into several conductors presents in the plane of said magnetic field a concave surface opposite the conductors of the divided electrode.

9. Tube according to claim 6, wherein the electrode, which is divided into a plurality of conductors, comprises a conductor effecting the delay of the wave and located between two massive conductors, and the surface of the second electrode is in the plane of said magnetic field convex relative to said divided electrode.

10. Tube according to claim 6, wherein the electrode, which is divided into a plurality of conductors, comprises a massive conductor located between two conductors effecting the delay of the wave, and the surface of the second electrode is in the plane of said magnetic field concave relative to said divided electrode.

ALFRED LERBS.

REFERENCES CITED

The following references are of record in the file of this patent:

UNITED STATES PATENTS

| Number | Name | Date |
|---|---|---|
| 2,122,538 | Potter | July 5, 1938 |
| 2,241,976 | Blewett et al. | May 13, 1941 |
| 2,289,756 | Clavier et al. | July 14, 1942 |
| 2,300,052 | Lindenblad | Oct. 27, 1942 |
| 2,511,407 | Kleen et al. | June 13, 1950 |
| 2,516,944 | Barnett | Aug. 1, 1950 |
| 2,541,843 | Tiley | Feb. 13, 1951 |